United States Patent

[11] 3,590,636

| [72] | Inventor | William C. Eddy, Jr.<br>Columbus, Ohio |
|---|---|---|
| [21] | Appl. No. | 770,652 |
| [22] | Filed | Oct. 25, 1968 |
| [45] | Patented | July 6, 1971 |
| [73] | Assignee | Industrial Nucleonics |

[54] METHOD FOR DETERMINING AIRCRAFT LIFT CAPABILITY USING AIR DENSITY MEASUREMENT
39 Claims, 7 Drawing Figs.

| [52] | U.S. Cl. | 73/178 |
|---|---|---|
| [51] | Int. Cl. | G01c 21/00 |
| [50] | Field of Search | 73/178, 178 H, 178 T, 32; 250/43.5, 83.6 |

[56] References Cited
UNITED STATES PATENTS

| 3,102,199 | 8/1963 | Zito | 250/83.6 X |
| 3,196,271 | 7/1965 | Wright | 250/43.5 X |

Primary Examiner—Donald O. Woodiel
Attorneys—William T. Fryer, III, C. Henry Peterson and Lowe and King ABSTRACT: A lift indicator for either fixed or rotary wing aircraft includes a nucleonic density gauge for deriving a density altitude indicating signal and means for deriving a temperature indicating signal. The signals are nonlinearly combined to derive the lift indication which can be correlated to the ability of a rotary wing aircraft to take off or land vertically or for a fixed wing aircraft to take off from a runway of known length. The density altitude indicating signal is combined with an indicated airspeed signal derived from a pitot tube to derive a true airspeed-indicating signal.

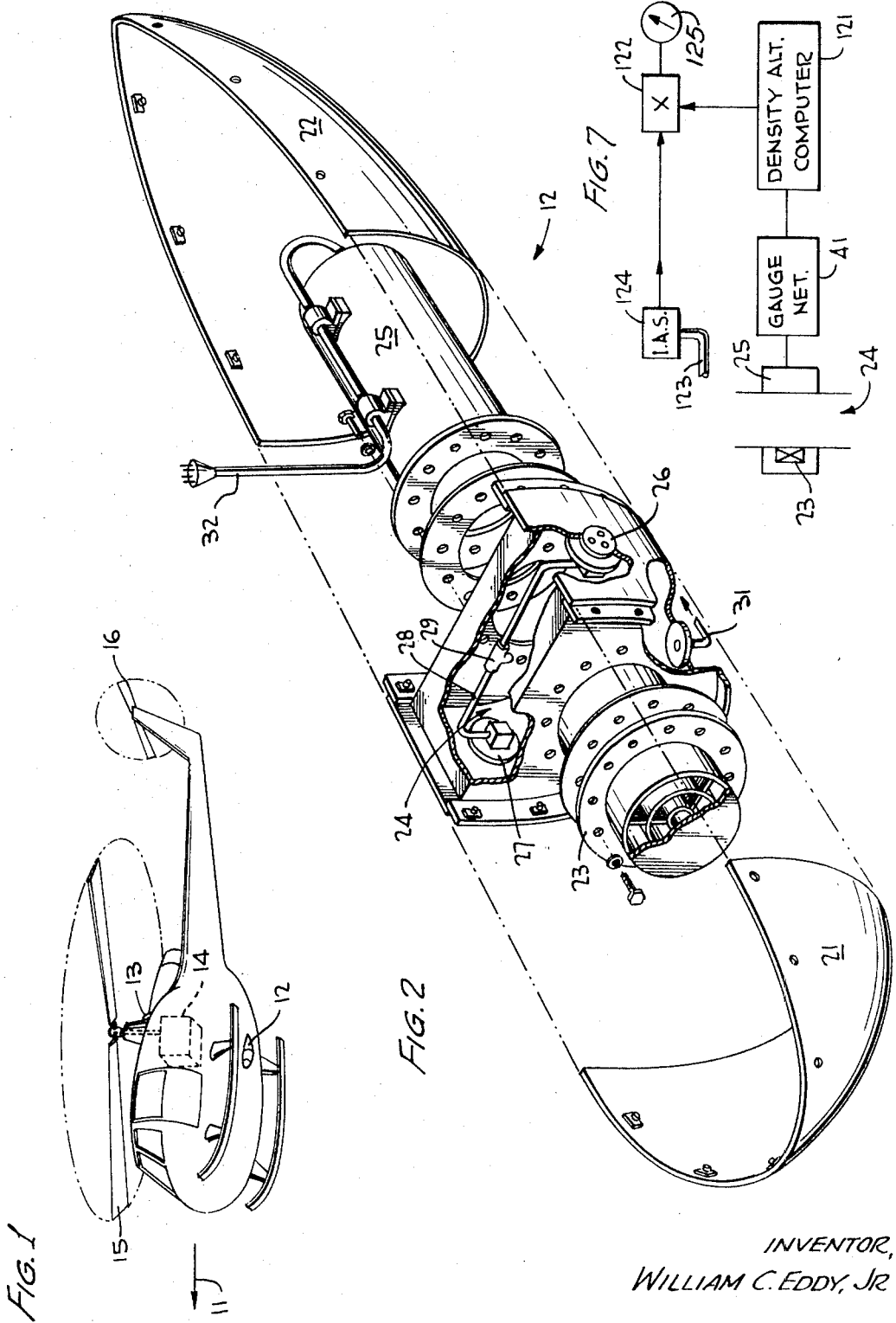

INVENTOR,
WILLIAM C. EDDY, JR.
BY
Lowe & King
ATTORNEYS

METHOD FOR DETERMINING AIRCRAFT LIFT CAPABILITY USING AIR DENSITY MEASUREMENT

The present invention relates generally to aircraft flight indicators and, more particularly, to a density altitude indicator utilizing a density gauge including a penetrating radiation source.

For both fixed and rotary wing aircraft, lift is one of the most important parameters governing performance, since it determines whether a particular load can be made airborne. For fixed wing aircraft, the lift factor, in combination with the gross weight of the craft, can be utilized to determine if a particular runway has sufficient length for takeoff. For rotary wing aircraft, such as helicopters and VTOLS/STOLS, the lift factor can be utilized to determine if the craft can lift or land a particular load in the vertical direction.

Two important factors in determining the lift factor of either a fixed or rotary wing turbine-powered aircraft are air density and temperature. Studies of turbine engines, the types of engines generally employed in modern rotary and high-speed fixed wing aircraft, indicate that air temperature is the most significant independent variable related to engine power, assuming constant air density. In contrast, air density has been found to be the most significant independent variable affecting lift, assuming constant engine power. Thereby, in determining the lift capability of turbine powered aircraft accurately, air density and temperature parameters should be combined in an appropriate formulation, which has been found to be related to gross aircraft weight, W, as:

$$W = a_0 + a\rho - aay2T + a_3\rho^2 - a_4T^2 + a_5\rho T \quad (1); \text{ where:}$$

$a_0, a_1, a_2, a_3, a_4$ and $a_5$ are coefficients determined by the aircraft and gauges for measuring air density and temperature;

$\rho$ = total density of the air, including the partial vapor and air pressures; and $T$ = air temperature.

Systems for computing the lift capabilities of aircraft have generally in the past determined air density only from ambient pressure and temperature data. It has been found, however, that the determination of air density from pressure and temperature data leads to significant density from pressure and temperature data leads to significant density errors, on the order of 5 percent, for ambient conditions characterized by hot and humid environments. The pressure, temperature technique for determining lift characteristics fails, in many cases, to account sufficiently for the water vapor density in the atmosphere where the aircraft is located, particularly in hot humid environments.

In accordance with the present invention, a direct indication of air density, for use in a lift-determining apparatus, is derived by means of a penetrating radiation density gauge, utilizing, for example, a nucleonic energy source of beta or gamma rays. The penetrating radiation gauge derives a true air density measurement that is nearly independent of humidity and has an error of less than 0.5 percent. The density gauge response is a function of dry air density, as well as water vapor partial pressure, since these parameters directly determine the amount of penetrating radiation absorbed by an air sample taken from the environment where the aircraft is located.

The penetrating radiation density gauge response is transformed into an indication of a parameter known as the "density altitude" of dry air. Density altitude is a meteorological term which has been defined in Manual of Barometry, First Edition, U.S. Department of Commerce - Weather Bureau, Volume 1, 1963, as: "The term 'density altitude' pertaining to any point in the actual atmosphere from which the existing air density is known denotes the altitude above sea level in the standard atmosphere characterized by the known air density." The standard atmosphere is defined in accordance with United States meteorology standards as the pressure equivalent to that exerted by 760 millimeters of mercury at 15° C. under a standard gravity of 9.80665 meters per second squared. Mathematically, density altitude, $h$, at a particular point in the atmosphere can be calculated up to an altitude of approximately 35,000 feet as:

$$h = C_0(1 - b_1\rho)^{C_2} \quad (2), \text{ where:}$$

$C_0$, $b_1$ and $C_2$ are constants. The virtual temperature, $T_c$, is defined as the temperature which dry air must have at a given barometric pressure, P, to have: the same density as moist air at the same pressure P and a given temperature, T; and the ratio of $m_v/m_a$, provided the dry and moist air react in accordance with the perfect gas equation, where: $m_a$ = the mass of air in a sample volume and $m_v$ = water vapor mass in the sample. Utilizing the virtual temperature to relate moist air density to dry air temperature, the density of an air volume, including water vapor and dry air, can be written as:

$$\rho = \frac{m_a + m_v}{V} = \frac{P}{RT_v} \quad (3)$$

where:

$V$ = the sample volume;
$R$ = the universal gas constant;
$T_v$ = virtual temperature in degrees Rankine, and
$P$ = barometric pressure in inches of mercury. Substituting equation (3) into equation (2), yields the relationship between density altitude and density as:

$h = C_0(1 - C_1\rho)^{C_2}$ (4). From equation (4), it is seen that the density altitude, $h$, is a nonlinear, exponential function of total air density, i.e., the density of the water vapor and dry air, and is not necessarily determined in response to pressure and temperature measurements. Actually, more accurate indications can be derived if pressure and temperature measurements are not utilized for the density altitude determination.

The total lift factor of a turbine powered aircraft is determined by a combination of the density of the environment where the aircraft is located, as well as the power capabilities of the aircraft engine. It has been found that the performance of aircraft turbine engines is adversely affected by temperature, whereby the output power of turbine engines is degraded as a function of temperature squared. Thereby, in accordance with another aspect of the present invention, the total lift factor determination is made by combining a signal indicative of ambient temperature with the accurate density altitude indicating signal derived by a penetrating radiation gauge. The temperature signal can be derived either from a gauge or manually, as the aircraft degradation is not particularly great in the normally expected atmospheric environments. For example, a typical turbine engine suffers a power loss on the order of 1 or 2 percent in response to a temperature change of 10° C. in an atmosphere having a temperature of approximately 30° C.

The lift factor computation of the present invention can be utilized for determining the maximum gross weight which an aircraft can carry for environmental conditions being monitored for either a fixed or rotary wing craft. For either type of aircraft, the determination of whether a particular load can be carried is made merely by an operator actuating a pair of dials and observing indicator lamps. In accordance with another aspect of the invention, a rotary wing pilot can determine if a vertical landing can be made merely by turning dial means and activating a button, once he has reached an altitude of approximately 500 feet above ground. The indication of landing safety is again ascertained by actuation of signal lamps.

In accordance with another aspect of the invention, the density altitude signal derived from the radiation density gauge is multiplied with a signal commensurate with indicated air speed, derived from a pitot tube. The resulting product signal has an amplitude corresponding with actual or true airspeed regardless of the aircraft altitude. Prior art systems, wherein density altitude is not included in the determination of airspeed, do not provide an accurate representation of true airspeed since ram pressure resulting from airflow forces against the pitot tube are not compensated as a function of air density changes. With prior art uncompensated systems, if an aircraft velocity remains constant but the density of ambient air changes the force which a unit volume of air exerts against the pitot tube varies and an erroneous indication of a change in aircraft speed is derived. By utilizing the present invention, this possibility is obviated since local air density is accurately monitored with a nucleonic radiation gauge.

It is, accordingly, an object of the present invention to provide a new and improved aircraft flight indicator gauge.

Another object of the invention is to provide a new and improved gauge for indicating aircraft density altitude.

It is an additional object of the present invention to provide a new and improved system for indicating aircraft lift capabilities.

A further object of the invention is to provide a new and improved gauge for indicating true aircraft speed.

Another object of the invention is to provide an aircraft speed indicator wherein pitot tube response is combined with the output of a density altitude gauge including a nucleonic radiation source.

Another object of the invention is to provide a new and improved system and method for determining turbine aircraft lift capabilities wherein direct density measurements are combined with temperature indications.

Still another object of the present invention is to provide an aircraft lift indicator which accurately reflects water vapor density, as well as dry air density, even in hot and humid environments.

Still another object of the invention is to provide in a fixed wing aircraft a new and improved system for indicating whether an aircraft having a predetermined gross weight can take off from a certain landing field.

Another object of the invention is to provide a new and improved system and method for indicating the maximum permissible gross weight of an aircraft taking off from a runway having a predetermined length.

Still another object of the invention is to provide, in a rotary wing aircraft, a new and improved system and method for indicating the takeoff and landing capabilities of the aircraft.

The above and still further objects, features and advantages of the present invention will become apparent upon consideration of the following detailed description of several specific embodiments thereof, especially when taken in conjunction with the accompanying drawings, wherein:

FIG. 1 is a perspective view of a helicopter equipped with density- and temperature-measuring gauges in accordance with the present invention;

FIG. 2 is a perspective view of the apparatus for sampling air density utilized in the helicopter of FIG. 1;

FIG. 7 is a schematic diagram of an air speed-indicating gauge in accordance with the invention.

Figure 3:
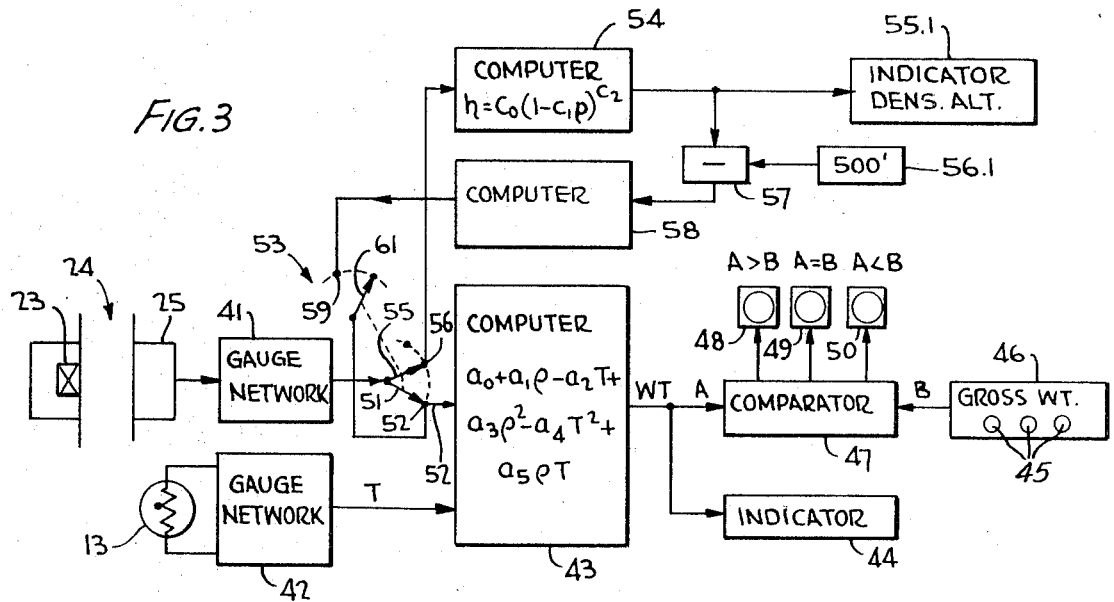
FIG. 3 is a block diagram of a system utilized in conjunction with the helicopter and air sampling apparatus of FIGS. 1 and 2.

Reference is now made to FIG. 1 of the drawings wherein there is illustrated a rotary wing aircraft, specifically helicopter 11, which includes air density sensor unit 12 and temperature-responsive element 13. Density sensor 12 is positioned on the underneath side of the fuselage of craft 11 and includes an air scoop for withdrawing air from the atmospheric environment through which the helicopter is "flying," either on the ground surface or above. The temperature, pressure and humidity of the air sample are virtually identical to those of the ambient air in which aircraft 11 is located. Temperature sensor 13 is positioned at the air inlet chamber of turbine engine 14 which drives the helicopter main rotor 15 and aft rotor 16 by way of suitable linkages, well known to those skilled in the helicopter art.

The density of the air sampled by sensor 12 is determined with a gauge including a penetrating radiation source, such as a nucleonic beta ray source, by measuring the amount of radiation absorbed in an airpath located between a nucleonic source and detector. Density sensor 12, shown specifically in an exploded view in FIG. 2, includes forward and aft fairing sections 21 and 22, having aerodynamic characteristics to minimize the effect on the performance of helicopter 11.

Positioned in the forward section 21 is a collimated beta ray source 23 which emits a beam of penetrating radiation particles that propagates through sampling chamber 24 to ion chamber 25, located in the aft fairing section 22. Ion chamber 25 derives a DC voltage directly proportional to the number of beta ray particles impinging thereon, hence a signal having an amplitude inversely proportional to the density of the medium in chamber 24.

Ambient air is admitted into chamber 24 by way of static pressure taps 26 and 27, positioned on opposite sides of the walls forming chamber 24. Pressure taps 26 and 27 include apertures through which ambient air flows into static pressure tubes 28, having unions with the opposite ends of T coupling element 29. The stem of T element 29 thereby feeds ambient air from opposite sides of helicopter 11 into air-sampling chamber 24. Flow through chamber 24 is established by providing vent tube 31 at the bottom of the chamber, whereby a flow path of ambient air subsists between T element 29 and vent tube 31 in the beam path of the penetrating radiation beam source 23.

Vent tube 31 includes a right-angle bend so that the air flowing through it is directed rearwardly of helicopter 11. Thereby, the pressure at the exhaust end of vent tube 31 is always less than the pressure at the apertures of static pressure taps 26 and 27 and a continuous flow through chamber 24 is established. The design of vent tube 31 is such that the reduced wake pressure at the exhaust end limits the flow rate through chamber 24 to a relatively small mass flow volume under all flight conditions. The flow rate through chamber 24 is sufficiently low to have virtually no effect on the density of the air within the chamber relative to the density of the ambient air, and the gas flowing through chamber 24 can be considered as not being compressed to any measurable degree.

The position of density sensor unit 12 on the underneath side of the fuselage of helicopter 11 enables the air sample to be maintained at ambient temperature, so that the density measurement is accurately maintained. Any effects that rotors 15 and 16 may have on the temperature of the air drawn into sensor 12 are minimized by the aforementioned position of sensor 12 and the sensor is shielded from the direction of solar radiant heat. The bottom surfaces of sensor unit 12 are coated with a highly reflective epoxy paint, to minimize air temperature increases over ambient which may occur in response to ground reflected solar heat.

In operation, the air and moisture molecules drawn into chamber 24 through pressure 26 and 27 absorb beta particles in the beam generated by source 23 to reduce the level of radiation reaching ion chamber detector 25. The output response of chamber 25 represents to within 0.5 percent accuracy the density of the air in chamber 25 for all expected temperature and humidity relationships. The response of chamber 25 is coupled by cable 32 to the interior of helicopter 11, where it is combined, after suitable processing, with the turbine inlet air temperature indicating signal derived by sensor 13.

One particular embodiment for combining the responses of sensors 12 and 13 is shown in the block diagram of FIG. 3. The responses of ion detector 25 and temperature sensor 13 are fed to gauge networks 41 and 42, respectively. Network 41 converts the absorption indicating output signal of detector 25 into a signal directly proportional to the density of the medium between source 23 and the detector. While gauge 41 effectively derives an output signal that is the reciprocal of the voltage level generated by detector 25, gauge network 42 derives a signal directly proportional to the temperature sensed by detector 13.

To determine the effective lift capabilities of helicopter 11 for the environmental conditions detected and for the parameters of the particular helicopter, the outputs of networks 41 and 42 are combined in computer 43, with the former connection being established by way of armature 51 and contact 52 of switch 53.

Computer 43, which may be either of the analog or digital type, combines the responses of gauge networks 41 and 42 in accordance with equation (1), supra. The coefficients $a_0-a_5$ in Equation (1) are determined by the physical properties of helicopter 11 and the responses of the density and temperature sensors, as well as gauge networks 41 and 42. Computer 43 derives an output signal indicative of the lift capability of helicopter 11, in terms of weight, whereby the temperature terms, $T$ and $T^2$, are subtracted from the $a_0$, $\rho$, $\rho^2$ and $\rho T$ terms. Hence, as the ambient air density increases the lift capabilities of helicopter 11 also increase, but as temperature rises lift capabilities are diminished. With increasing temperature, lift capabilities decrease because the power which turbine engine 14 is capable of delivering becomes smaller. Conversely, with increasing air density, the airfoil has a greater effect in sustaining aircraft flight.

The coefficients $a_0-a_5$ of the equation solved by computer 43 are such that the computer output is a signal amplitude directly indicative of the weight which helicopter 11 can lift for the density and temperature sensed by detectors 13 and 25. The output signal of computer 43 is fed directly to a suitable indicator 44 to provide the pilot with an indication of the weight which can be loaded into the helicopter.

As an auxiliary feature, the helicopter pilot can be provided with visual indicators to inform him if the lift capabilities of helicopter 11, in the particular atmosphere where the craft is located, are greater than the load he desires to place in the craft. To this end, manually adjustable dials 45 are provided to control the magnitude of a signal derived by signal generator 46 as a function of the expected helicopter gross weight, i.e., the weight of the helicopter plus the weight of the cargo. The output of generator 46 is compared with the output of computer 43 in network 47, which derives one of three outputs, respectively indicative of: the computed weight being greater than the dialed weight; the computed and dialed weights being approximately equal; and the dialed weight being greater than the computed weight. Visual indications of these three conditions are provided by three lamps 48—50, respectively bearing colors of green, yellow and red. If the pilot observes that green light 48 is lit, he is advised that ambient atmospheric conditions are suitable for any operations to be performed. If the yellow or amber light 49 is lit, the operator should use extreme caution in takeoff, and should avoid a direct vertical takeoff or remain on the ground. The activation of red lamp 50 signals to the pilot that he should not attempt takeoff.

Density altitude is a factor to which many pilots are accustomed and desire to be apprised. In accordance with another aspect of the present invention, density altitude is computed simultaneously with the lift capability derived by computer 43. To this end, the density indicating output signal of gauge network 41 is fed to the input of computer 54 via contact 56 and armature 55, gauged with armature 51. Computer 54 responds to the output of gauge network 41 to derive the density altitude signal in accordance with equation (4), supra, and feeds a signal to density altitude indicator 55.1.

Difficulty is frequently encountered in landing a rotary wing aircraft, such as helicopter 11, as insufficient lift is available during the final downward approach to sustain vertical flight. In accordance with another aspect of the present invention, when the helicopter pilot reaches a predetermined altitude above ground, where air density can be extrapolated with a fair degree of accuracy, such as 500 feet, he can be apprised of an approximate indication of the capability of the aircraft to land vertically, considering the ambient temperature and air density of the atmosphere where the craft is located. To these ends, the density altitude output of computer 54 is subtracted from the altitude of the aircraft above the landing surface, such as 500 feet, and the air density at the lower altitude is computed. In response to the computed air density at the lower altitude, and the ambient temperature, the aircraft lift factor at the assumed landing location is computed and compared with the gross weight input derived by generator 46.

In particular, the density altitude output of computer 54 is subtracted in difference taking network 57 from a predetermined voltage indicative of the elevation difference between the aircraft location and the landing point, as derived by source 56.1. The output of network 57 is thereby a signal indicative of the density altitude of a possible landing area, 500 feet below the elevation of helicopter 11, $h-500$ feet. The output of network 57 is translated in computer 58 into a signal indicative of approximate air density at the proposed landing site, in accordance with:

$$\rho_{(h-500')} = \frac{1}{C_1}\left[1 - \left(\frac{C_0}{h-500'}\right)\right]^{C_2} \quad (5)$$

The output of computer 58 is fed via armature 61 and contact 59 of switch 53 to the input of computer 43 when it is desired to determine if helicopter 11 can land at the proposed landing site. When it is desired to determine if helicopter 11 can land at the proposed site, switch 53 is activated so that ganged armatures 51 and 61 thereof respectively engage contacts 56 and 59 while contact 55 is open circuited. Thereby, the outputs of gauge network 41 and computer 58 are respectively fed to computers 54 and 43 while helicopter 11 is in the landing mode. During the takeoff mode, switch 53 is activated so that armatures 51 and 55 respectively engage contacts 52 and 56, while armature 61 and contact 59 are open circuited.

During the landing mode, the output of computer 43 is compared in network 47 with the gross weight indicating signal derived by generator 46. Comparator 47 responds to the outputs of computer 43 and generator 46 to selectively activate lamps 48—50 as indicated supra. If green light 48 is activated, the pilot is provided with an indication that air density and temperature conditions 500 feet below helicopter 11 will safely support a hovering or vertical landing. If amber light 49 is activated while switch 53 is in the landing mode, the pilot is advised that conditions 500 feet below his present altitude are marginal for a vertical landing and that he should attempt flying the helicopter in both the vertical and horizontal directions for landing; if the red lamp 50 is activated the pilot must land helicopter 11 by flying, rather than performing a vertical landing. While the results obtained with switch 53 in the landing mode are not 100 percent accurate because the air density at the landing site is not precisely known but extrapolated, they are sufficiently accurate for the majority of applications to enable the helicopter pilot to obtain sufficient information to perform a safe landing.

Figure 4:
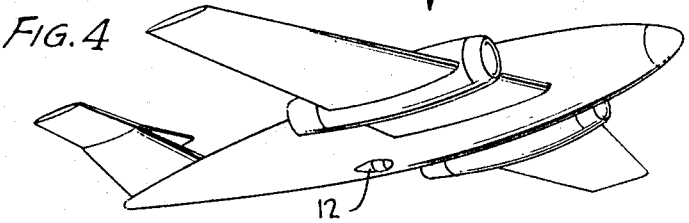
FIG. 4 is a perspective view of a fixed wing aircraft including the air sampling apparatus of FIG. 2.
Figure 5:
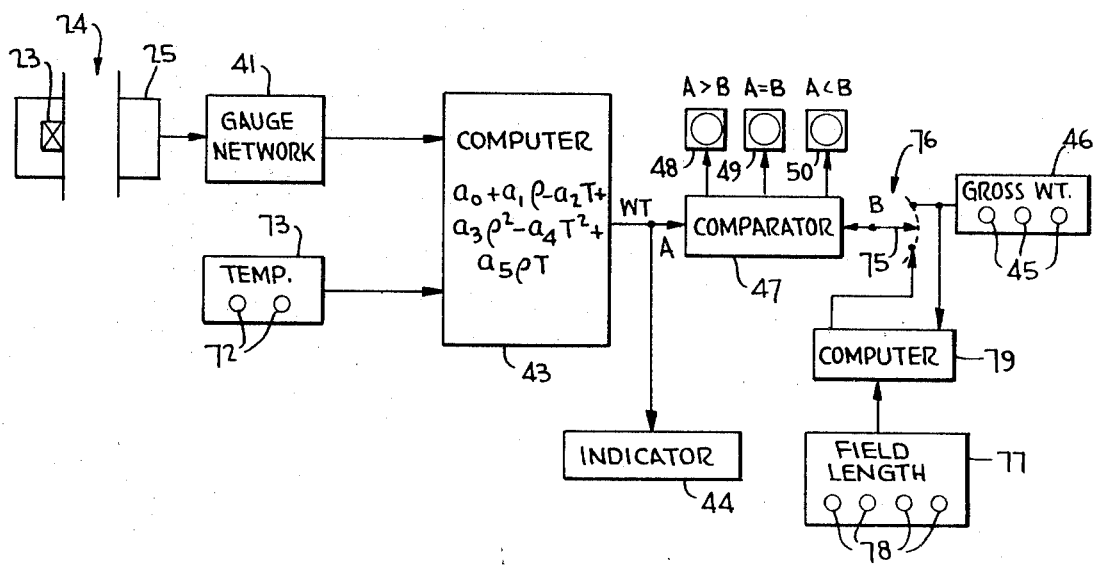
FIG. 5 is a block diagram of a system utilized in conjunction with the fixed wing aircraft of FIG. 4 for determining if the aircraft is capable of taking off from a field having a predetermined length runway.

Reference is now made to FIGS. 4 and 5 of the drawings wherein the principles of the present invention are illustrated in conjunction with a takeoff of a fixed wing aircraft. On the fixed wing aircraft, the air density sensor unit 12 is positioned on the lower portion of the fuselage of aircraft 71 and functions in exactly the same manner as indicated supra with regard to the rotary wing aircraft. The lift indicating apparatus of FIG. 5 is substantially the same as the corresponding apparatus of FIG. 3 for the rotary wing aircraft, with three exceptions, viz: the substitution of manual means for deriving a temperature indicating signal; the removal of the density altitude indicator and landing provision associated therewith; and the inclusion of a system for determining if a runway is sufficiently long to enable the aircraft to take off.

In the system of FIG. 5, the pilot approximates ambient temperature by observing gauges within the cockpit and activates dials 72 so that generator 73 derives a signal indicative of ground temperature. The output of temperature indicating signal generator 73 is combined in computer 43 with the output of gauge 41 in exactly the same manner as the outputs of the gauges 41 and 42 are combined in computer 43. Computer 43 in FIG. 5 is set so that the coefficients $a_0-a_5$ are adjusted for the flight performance characteristics of fixed wing aircraft 71.

The output of computer 43, a signal indicative of the lift characteristics of the fixed wing aircraft 71, in terms of weight, for the ambient temperature and air density of the environment in which the aircraft is located, is fed to comparator 47. Comparator 47 is also selectively responsive to a signal, in terms of weight, indicative of the aircraft gross weight or a combination of gross weight and the length of the runway from which aircraft 71 is taking off. The gross weight indicating signal is selectively fed to comparator 47 by way of contact 74 and armature 75 of switch 76.

The signal indicative of the combined gross weight and field length parameters is obtained by combining the outputs of generators 46 and 77, the latter deriving a signal directly proportional to field length. Generator 77 includes four manually activated dials 78 set by the pilot in accordance with the field length. The outputs of gross weight and field length generators 46 and 77 are combined in computer 79 which derives a lift requirement output signal in accordance with:

$$W' = \frac{K(G.W.)}{(F.L.)} \quad (6)$$

where:
$W'$ = the output of computer 79;
$G.W.$ = gross weight as derived by generator 46;
$K$ = a constant determined by the aircraft characteristics; and
F.L. indicates the runway length, as set by dials 78.

Hence, in one operating mode, the pilot activates switch 76 so that armature 75 engages contact 74 and turns dials 45 to the expected gross weight of the aircraft. If green light 48 is activated by comparator 47, the pilot sets dials 78 to indicate the length of the runway from which he is taking off and activates switch 76 so that the output of computer 79 is fed to the input of comparator 47. Computer 79 derives a signal indicative of the lift capability required by aircraft 71 to lift the load thereof from the runway. The lift requirement output signal of computer 79 is again compared in comparator 47 with the actual lift characteristics of the aircraft for the environment in which it is located and one of signal lights 48—50 is activated. For the fixed wing aircraft, the pilot proceeds to takeoff only if green light 48 is energized.

For a second operating mode, the field length is set by the pilot activating dials 78 and gross weight is determined with armature 75 engaging the output terminal of computer 79. Gross weight indicating dials 45 are adjusted until the two inputs of comparator 47 are approximately equal, as determined by activation of amber light 49.

Figure 6:
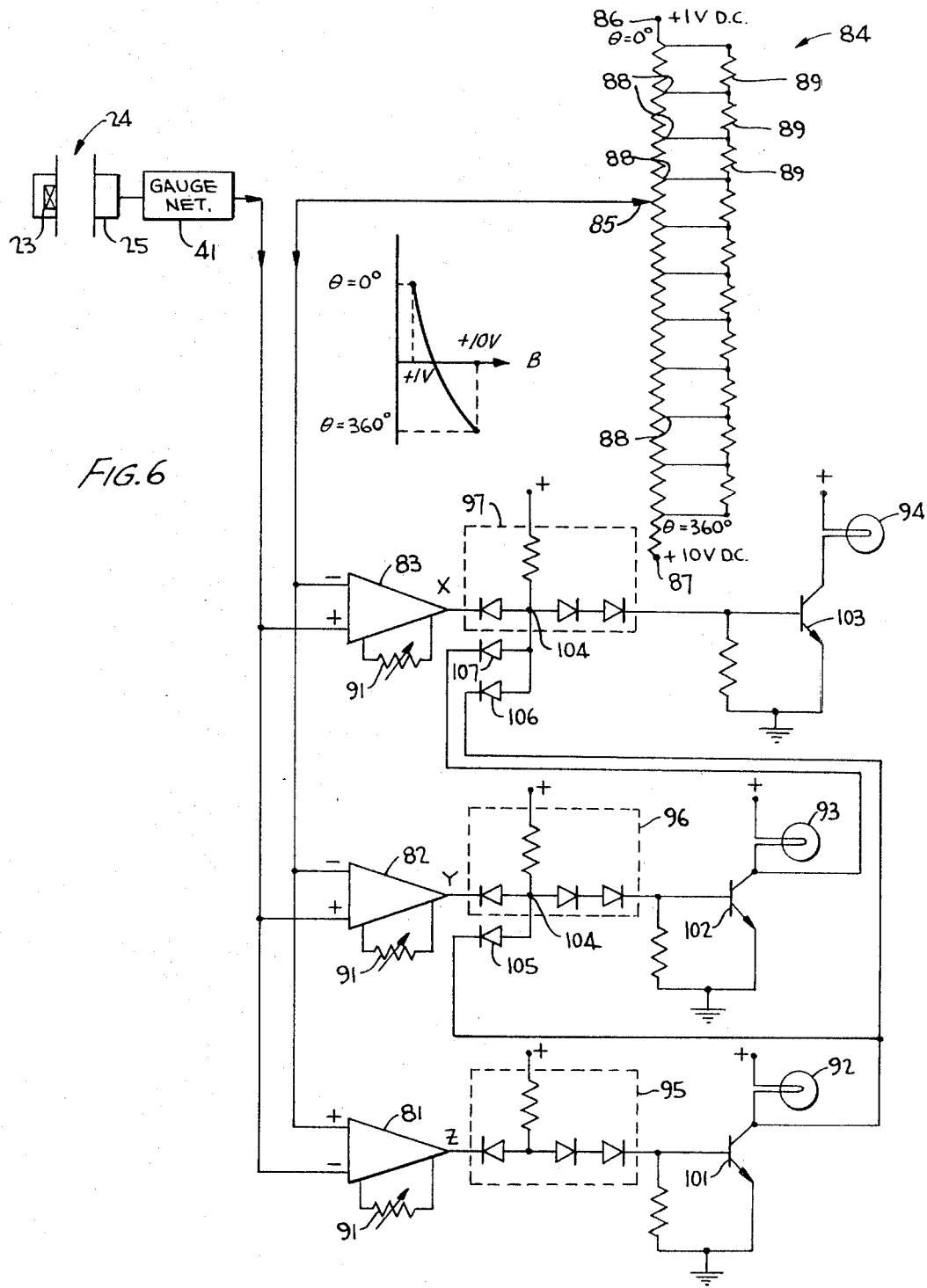
FIG. 6 is a circuit diagram of another embodiment of the invention adapted for use with aircraft that do not include turbine engines.

For certain types of aircraft, engine performance is not degraded as a function of temperature. This is particularly the case for slow-speed piston-type aircraft having fixed wings. The principles of the present invention are applicable to such aircraft since the lift capabilities thereof are directly related to air density. In accordance with another embodiment of the invention, particularly adapted for use in conjunction with piston aircraft and illustrated in FIG. 6, the relatively complex computer networks of FIGS. 3 and 5 are replaced with a simple function generator and a comparison network. In the system of FIG. 6, the function generator, calibrated in terms of density altitude and gross weight, is manually set by the pilot in response to signals derived by indicator lamps 48—50.

Considering the embodiment of FIG. 6 in detail, gauge network 41 derives a DC output signal directly proportional to the air density of the sample between penetrating radiation source 23 and detector 25. The output signal of gauge network 41 is fed in parallel to the positive input terminals of differential amplifiers 81 and 82, as well as the negative input terminal of amplifier 83. The negative input terminals of amplifiers 81 and 82, as well as the positive input terminal of amplifier 83, are driven in parallel by the tap 85 of potentiometer 84, having a relatively low positive DC voltage at terminal 86 and a higher positive DC voltage connected to terminal 87. Potentiometer 84 includes a multiplicity of taps 88, to which are connected fixed resistors 89. The values of resistors 89 are selected to provide an exponential function relating the position of tap 85 to the voltage at the tap in accordance with equation (2). Potentiometer 84 includes a pair of side-by-side dials coupled for rotation with slider 85 and calibrated as functions of density altitude and gross weight. The density altitude dial is calibrated whereby a relatively low density altitude analog signal is generated at the end of the potentiometer proximate high voltage terminal 87, while a potential commensurate with high-density altitude is derived at the end of the potentiometer slider nearest low-voltage terminal 86. In contrast, high and low gross weight analogs are generated proximate the high and low voltage terminals 87 and 86, respectively.

Amplifiers 81—83 respond to the inputs thereof to derive respectively binary 1 signals when: the amplitude of the voltage generated by gauge network 41 is greater than the voltage at tap 85; the output of gauge network 41 and the voltage at tap 85 are equal; and the voltage at tap 85 is greater than the voltage derived by network 41. To derive the binary 1 signals for these three conditions, amplifiers 81—83 include variable feedback resistors 91 having values adjusted to provide different responses for each of the amplifiers.

The binary 1 outputs of amplifiers 81—83 are combined in a fail-safe network for selectively activating only one of red, amber or green signal lamps 92—94. To this end, the output of each of amplifiers 81—83 is fed via a different one of biased diode networks 95—97 to the base of NPN driver transistors 101—103, having collectors which are respectively connected to signal lamps 92—94. The collectors of transistors 101—103 are connected in circuit with diode networks 96 and 97 so that only one of the transistors is activated at any time to provide a fail-safe network. To this end, the collector of transistor 101 feeds the positively biased terminal 104 in each of networks 96 and 97 via back biased diodes 105 and 106, respectively, while the collector of transistor 102 is connected through normally back biased diode 107 to terminal 104 of network 97.

In operation, if a binary one output is derived from amplifier 81, causing a forward bias to be applied to the base of transistor 101 and activation of lamp 92, terminals 104 of networks 96 and 97 are driven virtually to ground potential through the emitter collector path of transistor 101 to prevent forward biasing of the base emitter junctions of transistors 102 and 103. Thereby, if lamp 92 is energized, lamps 93 and 94 must remain extinguished. By a similar process, energization of lamp 93 precludes lighting of lamp 94.

The circuit of FIG. 6 can be utilized for two functions, namely to determine density altitude and ascertain if the aircraft on which the apparatus is located can take off with a predetermined gross weight or load. For the first application, the pilot adjusts the position of the slider 85 until the voltage derived thereby equals the output voltage of gauge network 42, as determined by amber lamp 93 being lit. To determine if the aircraft is capable of taking off with a predetermined gross weight, the pilot sets slider 85 at a position on potentiometer 84 commensurate with the desired gross weight and observes which of lamps 92—94 is activated. If green lamp 94 is activated, the pilot is apprised of a situation whereby there is no problem with regard to takeoff, while the activation of lamp 93 indicates to the pilot that there may be a problem in taking off at the weight set in by slider 85, and the energization of red lamp 92 signifies that a lower gross weight must be on the aircraft.

According to a further aspect of the invention, the density altitude determination made in accordance with the embodiments of FIG. 3 or 6 is nonlinearly combined with an indicated airspeed signal derived from a pitot tube. In particular, referring to FIG. 7, the output of gauge network 41, which is responsive to the amount of penetrating radiation from source 23 impinging on detector 25, is converted into a density altitude signal by computer 121, which may take a form of the type shown in either of FIGS. 3 or 6. Computer 121 responds to the density indicating output signal, ρ, of network 41, to derive the density altitude indication in accordance with equation (2), supra.

The density altitude indicating signal generated by computer 121 is combined in multiplier 122 with a signal commensurate with airspeed as derived from a conventional pitot pressure tube arrangement. To this end, pitot tube 123 is provided on an underneath surface of the fixed or rotary wing aircraft illustrated in FIGS. 1 or 4. The pressure variations sensed by pitot tube 123 are converted into an electrical signal by network 124, which is of a type well known to those skilled in the art for deriving a signal commensurate with indicated air speed. The responses of computer 121 and network 124 are nonlinearly combined in multiplier 122 which drives meter 125 with a signal commensurate with:

$$(P.P.) \times (D.A.) \times K = T.A.S. \quad (7),$$

where:
$P.P.$ = indicated airspeed as reflected in the pitot pressure indication derived from network 124;
$D.A.$ = density altitude as derived from computer 121;
$K$ = a constant; and
$T.A.S.$ = true airspeed.

While there have been described and illustrated several specific embodiments of the invention, it will be clear that variations in the details of the embodiments specifically illustrated and described may be made without departing from the true spirit and scope of the invention as defined in the appended claims.

I claim:
1. A method of determining the flying capability of an aircraft comprising the steps of monitoring the ambient air density in the atmosphere surrounding the aircraft with a penetrating radiation gauge, determining from the monitored air density the lift capability of the aircraft, and comparing the determined lift capability with an indication of required aircraft lift.

2. The method of claim 1 wherein the lift capability is determined for an altitude in the immediate vicinity of the aircraft.

3. The method of claim 1 wherein the lift capability is determined approximately for an altitude different from the aircraft altitude.

4. The method of claim 1 wherein the lift capability is determined approximately for an altitude on the order of 500 feet different from the aircraft altitude.

5. The method of claim 1 wherein the required aircraft lift is determined from the gross weight of the aircraft.

6. The method of claim 1 wherein the lift capability is determined for an altitude in the immediate vicinity of the aircraft, and the required aircraft lift is determined from the gross weight of the aircraft and the length of a runway available for takeoff.

7. A method of determining the flying capability of a turbine powered aircraft comprising the steps of monitoring the ambient air density in the atmosphere surrounding the aircraft with a penetrating radiation gauge, monitoring the ambient temperature in the atmosphere surrounding the aircraft, determining from the monitored air density and temperature the lift capability of the aircraft, and comparing the determined lift capability with an indication of required aircraft lift.

8. The method of claim 7 wherein the lift capability is determined for an altitude in the immediate vicinity of the aircraft.

9. The method of claim 7 wherein the lift capability is determined approximately for an altitude different from the aircraft altitude.

10. The method of claim 7 wherein the lift capability is determined approximately for an altitude on the order of 500 feet different from the aircraft altitude.

11. The method of claim 7 wherein the required aircraft lift is determined from the gross weight of the aircraft.

12. The method of claim 7 wherein the lift capability is determined for an altitude in the immediate vicinity of the aircraft, and the required aircraft lift is determined from the gross weight of the aircraft and the length of a runway available for takeoff.

13. A system for determining a parameter related to the lift capability of an aircraft comprising penetrating radiation gauge means adapted to be secured to an aircraft fuselage for deriving a first signal indicative of ambient air density in the atmosphere where the aircraft is located, and means responsive to said signal for deriving an output commensurate with a nonlinear function of said first signal to indicate the actual aircraft lift capability.

14. The system of claim 13 wherein said signal responsive means includes means for deriving the nonlinear function to indicate the weight which the aircraft can lift at an altitude in the immediate vicinity of the aircraft.

15. The system of claim 13 wherein said signal responsive means includes means for deriving the nonlinear function to indicate density altitude of the atmosphere at an altitude in the immediate vicinity of the aircraft.

16. The system of claim 13 wherein said signal responsive means includes means for deriving the nonlinear function to indicate approximate density altitude of the atmosphere at an altitude different from the aircraft altitude.

17. The system of claim 13 wherein said signal responsive means includes means for deriving the nonlinear function to indicate approximate density altitude of the atmosphere at an altitude on the order of 500 feet different from the aircraft altitude.

18. The system of claim 13 wherein said signal responsive means includes means for deriving the nonlinear function to indicate the weight which the aircraft can lift at an altitude different from the aircraft altitude.

19. The system of claim 13 wherein said signal responsive means includes means for deriving the nonlinear function to indicate the weight which the aircraft can lift at an altitude on the order of 500 feet different from the aircraft altitude.

20. The system of claim 13 wherein said signal means includes a nonlinear function generator for deriving a signal indicative of density altitude in response to an input from an operator's station, and means responsive to the density altitude and air density indicating signal for comparing the density altitude indicating signal with the air density indicating signal.

21. The system of claim 13 wherein said signal responsive means includes means for deriving a signal indicative of required aircraft lift, and means responsive to said lift indicating signals for comparing the required lift signal with the actual lift capability.

22. The system of claim 13 wherein said signal responsive means includes means for deriving a signal indicative of required aircraft lift, and means responsive to said lift indicating signals for selectively indicating when: (a) the required lift exceeds the actual lift; (b) the actual and required lift are approximately equal; and (c) the actual lift exceeds the required lift.

23. The system of claim 22 wherein said indicating means includes fail-safe means for enabling only the (a) indication to be derived if the (a) indication is derived simultaneously with either the (b) or (c) indication and for enabling only the (b) indication to be derived if the (b) indication is derived simultaneously with the (c) indication.

24. The system of claim 13 wherein said signal responsive means includes means for deriving a signal indicative of aircraft gross weight, and means responsive to the lift indicating and gross weight indicating signals for indicating the aircraft flight ability.

25. The system of claim 13 wherein said signal responsive means includes means for deriving a signal indicative of required aircraft lift, said required lift signal deriving means including means for combining signals indicative of aircraft gross weight and runway length, and means responsive to said lift indicating signals for comparing the required lift signal with the actual lift capability.

26. A system for determining a parameter related to the lift capability of a turbine powered aircraft comprising penetrating radiation gauge means adapted to be secured to an aircraft fuselage for deriving a first signal indicative of ambient air density in the atmosphere where the aircraft is located, means for deriving a second signal indicative of ambient air temperature at the turbine intake, and means responsive to said first and second signals for deriving a nonlinear output function indicative of the actual aircraft lift capability.

27. The system of claim 26 wherein said signal responsive means includes means for deriving the nonlinear function to indicate the weight which the aircraft can lift at an altitude in the immediate vicinity of the aircraft.

28. The system of claim 26 wherein said signal responsive means includes means for deriving a nonlinear function to indicate density altitude of the atmosphere at an altitude in the immediate vicinity of the aircraft.

29. The system of claim 26 wherein said signal responsive means includes means for deriving a nonlinear function to indicate approximate density altitude of the atmosphere at an altitude different from the aircraft altitude.

30. The system of claim 26 wherein said signal responsive means includes means for deriving a nonlinear function to indicate approximate density altitude of the atmosphere at an altitude on the order of 500 feet different from the aircraft altitude.

31. The system of claim 26 wherein said signal responsive means includes means for deriving the nonlinear function to indicate the weight which the aircraft can lift at an altitude different from the aircraft altitude.

32. The system of claim 26 wherein said signal responsive means includes means for deriving the nonlinear function to indicate the weight which the aircraft can lift at an altitude on the order of 500 feet different from the aircraft altitude.

33. The system of claim 26 wherein said signal responsive means includes means for deriving a signal indicative of required aircraft lift, and means responsive to said lift indicating signals for comparing the required lift signal with the actual lift capability.

34. The system of claim 26 wherein said signal responsive means includes means for deriving a signal indicative of required aircraft lift, and means responsive to said lift indicating signals for selectively indicating when: (a) the required lift exceeds the actual lift; (b) the actual and required lift are approximately equal; and (c) the actual lift exceeds the required lift.

35. The system of claim 26 wherein said signal responsive means includes means for deriving a signal indicative of aircraft gross weight, and means responsive to the lift indicating and gross weight indicating signals for indicating the aircraft flight ability.

36. The system of claim 39 wherein said signal responsive means includes means for deriving a signal indicative of required aircraft lift, said required lift signal deriving means including means for combining signals indicative of aircraft gross weight and runway length, and means responsive to said lift indicating signals for comparing the required lift signal with the actual lift capability.

37. The system of claim 26 wherein said nonlinear function deriving means includes means for combining the first and second signals in opposite senses.

38. The system of claim 26 wherein said nonlinear function deriving means includes means for combining the first and second signals in accordance with:

$$a_0 + a_1\rho - a_2 T a_3 \rho + a_4 T^2 + a_5 \rho T,$$

where:

$a_0 - a_5$ are constants;
$T$ = the value of temperature indicated by the second signal; and
$\rho$ = the value of density indicated by the first signal.

39. A system for determining a parameter related to the lift capability of a turbine-powered aircraft comprising penetrating radiation gauge means adapted to be secured to an aircraft fuselage for deriving a first signal indicative of ambient air density in the atmosphere where the aircraft is located, means for deriving a second signal indicative of ambient air temperature, and means responsive to said first and second signals for deriving a nonlinear output function indicative of the actual aircraft lift capability.